United States Patent [19]

Theobald

[11] Patent Number: 4,570,503
[45] Date of Patent: Feb. 18, 1986

[54] COUNTERSHAFT TRANSMISSION
[75] Inventor: Michael R. Theobald, Princeville, Ill.
[73] Assignee: Caterpillar Tractor Co., Peoria, Ill.
[21] Appl. No.: 651,017
[22] Filed: Sep. 17, 1984
[51] Int. Cl.$^4$ ............................................. F16H 3/08
[52] U.S. Cl. .................................... 74/360; 74/331; 74/333
[58] Field of Search ................. 74/360, 359, 331, 333

[56] References Cited

U.S. PATENT DOCUMENTS

| | | | |
|---|---|---|---|
| 2,958,231 | 11/1960 | Gerst | 74/360 |
| 2,972,901 | 2/1961 | Gerst | 74/360 |
| 3,254,541 | 6/1966 | Schou | 74/360 |
| 3,400,601 | 9/1968 | Ruhl et al. | 74/360 X |
| 3,425,293 | 2/1969 | Krawczyk | 74/360 |
| 3,465,609 | 9/1969 | Fisher et al. | 74/360 |
| 3,540,556 | 11/1970 | Snoy et al. | 192/4 |
| 3,654,819 | 4/1972 | Link | 74/360 |
| 3,727,479 | 4/1973 | Wilson | 74/360 X |
| 3,858,455 | 1/1975 | Sisson et al. | 74/360 |
| 3,893,345 | 7/1975 | Sisson et al. | 74/360 X |
| 3,913,616 | 10/1975 | Horsch | 137/580 |
| 3,916,710 | 11/1975 | Sisson et al. | 74/360 X |
| 4,145,935 | 3/1979 | Herlitzek | 74/360 X |
| 4,275,607 | 6/1981 | Snoy | 74/15.63 |
| 4,333,358 | 6/1982 | Grattapaglia | 74/359 |
| 4,341,127 | 7/1982 | Stodt | 74/360 X |
| 4,392,391 | 7/1983 | Jameson et al. | 74/360 X |
| 4,463,622 | 8/1984 | Freiburger | 74/331 X |

FOREIGN PATENT DOCUMENTS

| | | | |
|---|---|---|---|
| 2904061 | 8/1980 | Fed. Rep. of Germany | 74/359 |
| 0094658 | 6/1983 | Japan | 74/359 |

OTHER PUBLICATIONS

Komatsu 510 (KIMCO510) Transmission Circa 1977.
SAE Article #720387 Dated April 10–12, 1972 (Gardner-Denver Company).

Primary Examiner—Leslie A. Braun
Assistant Examiner—Stephen B. Andrews
Attorney, Agent, or Firm—Charles E. Lanchantin, Jr.

[57] ABSTRACT

A countershaft transmission provides three forward speeds and three reverse speeds using an input shaft, an output shaft, an intermediate shaft, five rotating clutch assemblies of the interleaved multiple plate and disc type, and eight gears. The first speed clutch assembly is mounted on the intermediate shaft, the second and third speed clutch assemblies are mounted on the output shaft, the remaining directional clutch assemblies are mounted on the input shaft, and the clutch assemblies are generally compactly grouped. Advantageously, no separate idler gear and associated shaft are required.

15 Claims, 2 Drawing Figures

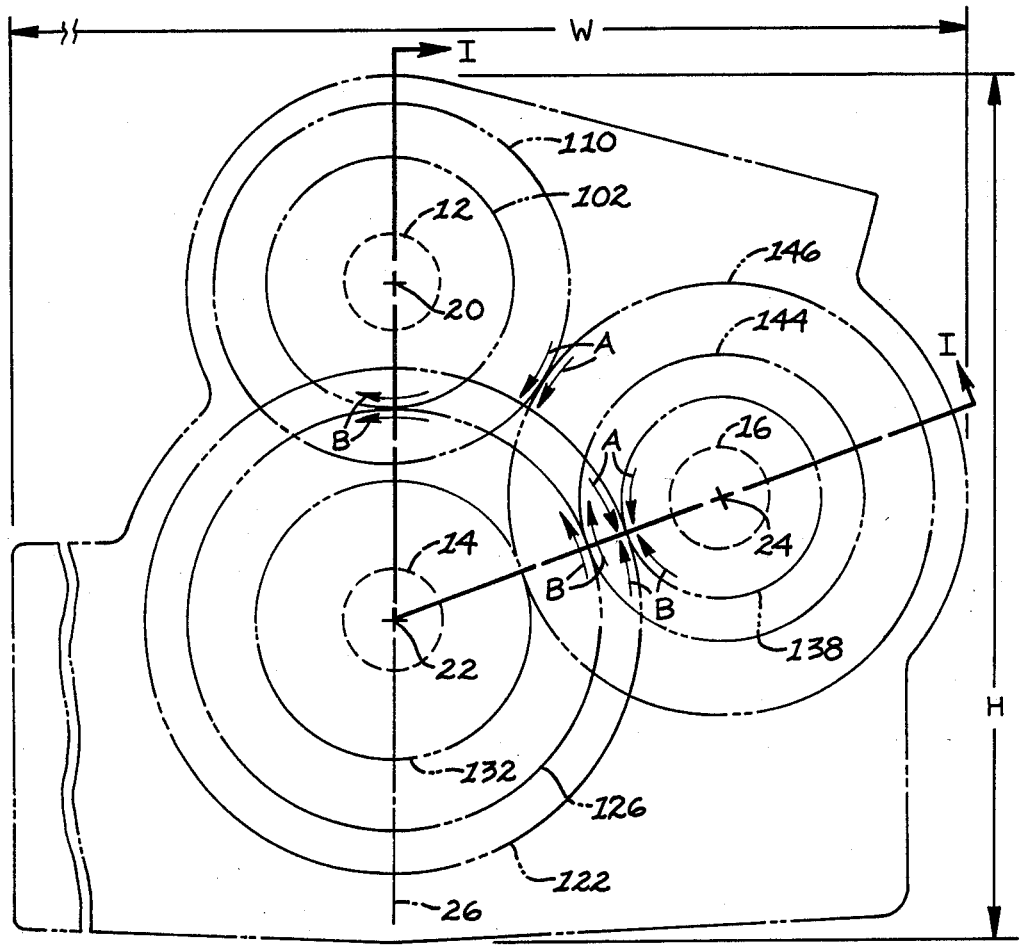

COUNTERSHAFT TRANSMISSION

DESCRIPTION

1. Technical Field

This invention relates generally to a countershaft transmission for a vehicle or the like, and more particularly to a countershaft transmission having a plurality of forward and reverse speeds using constant mesh gearing and a plurality of fluid actuated, rotating clutches of the interleaved multiple plate and disc type.

2. Background Art

Countershaft transmissions having a plurality of speed ratios in each direction of operation are particularly useful in the drive line of vehicles such as wheel loaders, rubber tired log skidders, and other heavy duty vehicles. Such transmissions are advantageous in that a plurality of rotating clutches and associated continually meshing gears can be so positioned on the usual parallel shafts as to allow considerable structural compactness and an adaptability to the elevational drop requirement between the input and output axes.

One powershaft transmission offered by Kabushiki Kaisha Komatsu Seisakusho, of Japan, is a countershaft unit driven by a longitudinally aligned engine and torque converter and employing a pair of directional clutches, three speed clutches, five shafts and eleven gears. Since the last shaft and two of the gears are merely used for transfer purposes, that transmission can basically provide three forward and three reverse speeds using four shafts and nine gears. While it is axially compact, and can provide the elevational drop between the input and output axes, it is more complex and costly than is desired. This is mainly due to the incorporation of an undesirable idler gear and associated shaft.

Clark Equipment Company also produces several countershaft transmission families and reference is made to U.S. Pat. No. 3,465,609 issued Sept. 9, 1969 to J. F. Fisher, et al, showing a reversible unit providing two, three or four speed options. However, that family has the disadvantage that the third speed clutch and its associated gears are located on the far side of the wall containing the remainder of the unit so that another housing wall is required and the unit is extended axially.

Further illustrating the prior art are the following U.S. Pat. Nos.: 2,958,231 issued Nov. 1, 1960 to C. Gerst; 2,972,901 issued Feb. 28, 1961 to C. Gerst; 3,254,541 issued June 7, 1966 to C. E. Schou; 3,540,556 issued Nov. 17, 1970 to J. B. Snoy, et al; 3,654,819 issued Apr. 11, 1972 to H. Link; 3,913,616 issued Oct. 21, 1975 to J. Horsch; 4,275607 issued June 30, 1981 to J. B. Snoy; and 4,333,358 issued June 8, 1982 to G. P. Grattapaglia. For the most part these transmissions have too many shafts and gears for the number of speeds provided and are therefor more complex than is necessary.

Accordingly, what is needed is a structurally simple and compact countershaft transmission providing at least two forward speeds and at least two reverse speeds using a maximum of three shafts and a minimum number of gears. For example, if three forward speeds and three reverse speeds are needed then the number of gears required in conjunction with the three shafts should preferably be limited to eight. These limitations are noted with respect to the primary speed shifting and directional functions, and should be considered independent of any subsequent transfer gear train that might be required in a particular vehicular environment.

Moreover, the desired countershaft transmission should preferably maximize parts commonality by using similarly sized rotating clutch elements, and have a long service life by designing the elements and their connections such that undesirably high operating speeds or clutch plate engagement speeds are avoided. And, the shafts, gears and rotating clutches should be radially internested and be of relatively short axial length so as to fit into the limited space in a vehicle and between the front and rear walls of a separable housing.

DISCLOSURE OF THE INVENTION

The present invention is directed to overcoming one or more of the above problems.

In one aspect of the invention there is provided a countershaft transmission including an input shaft having first and second gears freely rotatable thereon and first and second clutch assemblies for selectively connecting one of them to the input shaft for joint rotation, an output shaft having a third gear freely rotatable thereon and a fourth gear connected thereto and third clutch assembly for selectively connecting the third gear to the output shaft, and a third shaft having a fifth gear freely rotatable thereon, a sixth and a seventh gear connected to the third shaft and a fourth clutch assembly for selectively connecting the fifth gear to the third shaft, and with the first and third gears being connected, the second and seventh gears being connected, the third and sixth gears being connected, and the fourth and fifth gears being connected. This is effective to provide two forward and two reverse speeds.

Advantageously, an eighth gear can be mounted for free rotation on the output shaft and be intermeshed with the seventh gear, and a fifth clutch assembly can be provided to couple the eighth gear to the output shaft so as to provide three forward and three reverse speeds without the necessity for another shaft or use of an idler gear.

BRIEF DESCRIPTION OF THE DRAWINGS

FIG. 2 is a diagrammatic, front end elevational view of the countershaft transmission of FIG. 1 taken along line II—II thereof and showing the relationship of the various shaft axes and the constantly meshing gearing associated therewith, and the cutting plane of developed FIG. 1.

BEST MODE FOR CARRYING OUT THE INVENTION

Figure 1:
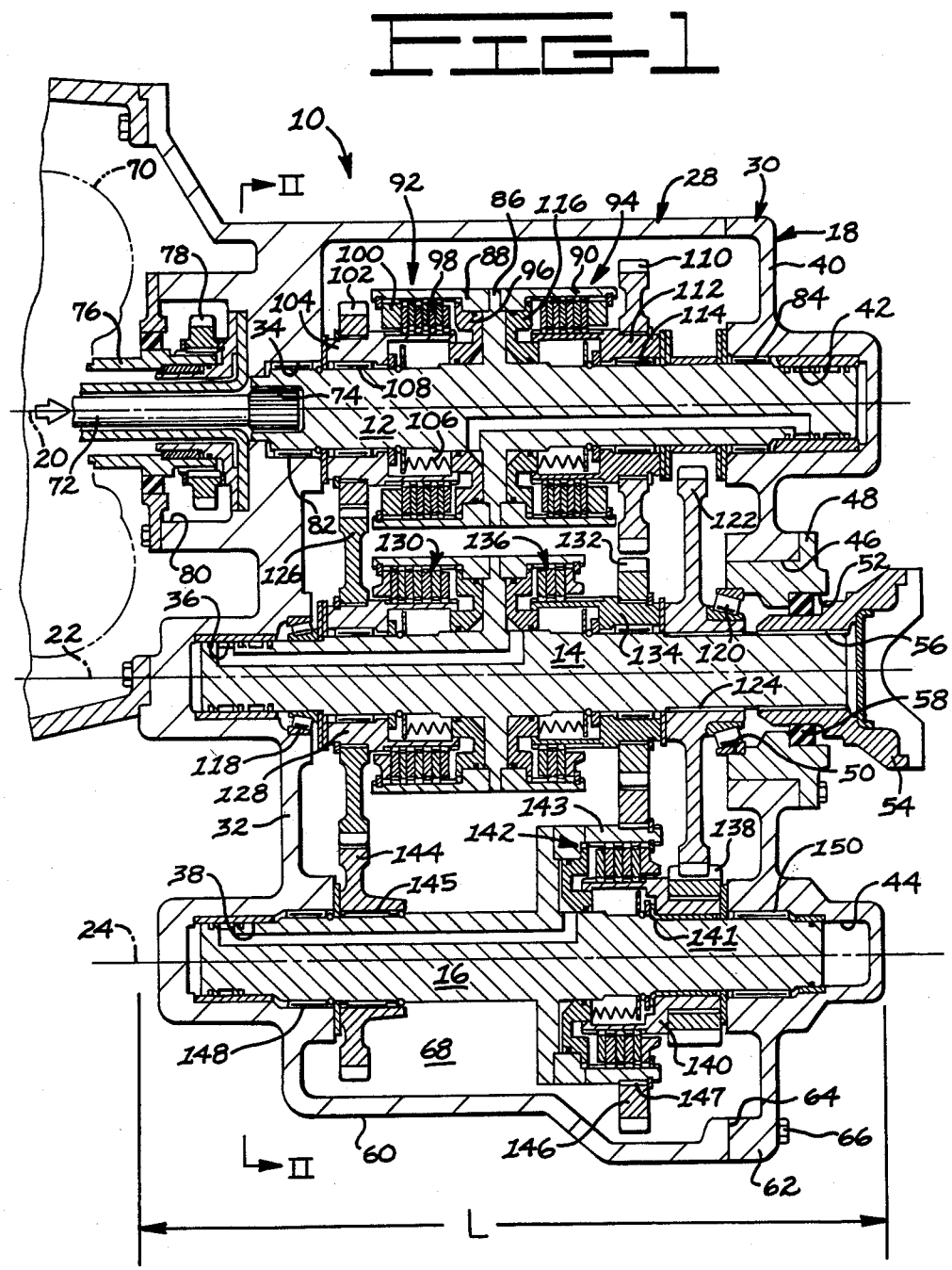
FIG. 1 is a diagrammatic, developed, but substantially side elevational sectionalized view of a three-speed forward and three-speed reverse countershaft transmission constructed in accordance with the present invention.

Referring to the developed sectional view of FIG. 1, there is shown a countershaft transmission 10 having an upper input shaft 12, a lower output shaft 14, and a third or intermediate shaft 16 rotatably supported in a housing or drop box 18. The shafts 12, 14 and 16 are rotatably mounted within the housing respectively along parallel axes 20, 22 and 24 and have an elevational end view relationship as shown in FIG. 2. The input and output axes 20 and 22 reside in a vertical plane 26, and the third axis 24 is located to one side thereof at an elevational level between the levels of the other two axes.

The housing 18 is generally constructed of two major pieces; namely, a front main case portion 28 disposed at the central portion and at the left when viewing FIG. 1, and a rear cover portion 30 located at the right. A front wall 32 of the main case portion integrally defines a stepped cylindrical bore 34 on the input axis 20, and blind cylindrically shaped stepped pockets 36 and 38 on the output axis 22 and on the third axes 24 respectively. Similarly, a rear wall 40 of the cover portion integrally defines blind cylindrically shaped stepped pockets 42 and 44 on the input axis 20 and on the third axis 24. A cylindrical bore 46 is also defined in the rear wall along the output axis 22 which is adapted to releasably receive an annular flange member 48 having an inner bearing seat 50 and an outer seal seat 52. An output yoke 54 is releasably secured to the rear part of the output shaft 14 by a spline joint 56, and an annular seal 58 extends between the seat 52 and the yoke. An encircling peripheral wall 60 extends rearwardly from the front wall and is releasably secured to a peripheral wall 62 of the rear cover portion 30 at a coupling joint 64 disposed on a transversely oriented vertical plane. A plurality of threaded fasteners 66 secure the case and cover portions positively together and serve to define a sealed internal chamber 68.

Input shaft 12 is driven by a hydrodynamic torque converter as is schematically indicated at 70 in the instant embodiment, with the torque converter being serially connected to an engine in the usual manner, although not illustrated. A torque converter output shaft 72 is releasably connected to the transmission input shaft 12 at a spline joint 74, and another torque converter member 76 drives a pump drive gear 78 rotatably disposed within an annular forwardly facing pocket 80 defined in the main case portion 28.

The front end of the input shaft 12 is rotatably supported in the bore 34 by a needle or roller bearing assembly 82, and the rear end is rotatably supported in the stepped pocket 42 by a similar needle or roller bearing assembly 84. An annular web 86 is integrally connected to the input shaft centrally thereof, and an internally splined front drum 88 and an internally splined rear drum 90 are integrally connected to the web. The drums 88 and 90 respectively form the driven members of a reverse clutch assembly 92 and a forward clutch assembly 94 of the usual interleaved multiple plate and disc type. For example, the front or reverse rotating clutch assembly 92 includes an annular actuating piston 96 selectively movable to the left under fluid pressure in a normal manner when viewing FIG. 1 to clamp a plurality of interleaved annular plates and friction discs 98 against a reaction plate 100. This connects a first gear 102 and associated hub assembly 104 for conjoint rotation with the input shaft. The reverse rotating clutch assembly is positively disengaged by movement of the actuating piston back to the right by a plurality of compression springs 106 when pressure is reduced to the actuating piston. This allows the first gear 102 and hub assembly 104 to freely rotate together on the input shaft through an intermediate needle or roller bearing assembly 108.

A second gear 110 and a hub assembly 112 splined thereto are also freely rotatably mounted on the input shaft 12 by a needle or roller bearing assembly 114. Movement of another actuating piston 116 of the forward clutch assembly 94 to the right when viewing the drawing will similarly couple the second gear 110 and the hub assembly 112 to the input shaft. Thus, actuation of directional clutch assemblies 92 and 94 are effective to provide drive to either of the gears 102 and 110, with it being understood that the designation of clutch assemblies 92 and 94 as being reverse and forward respectively is arbitrary and could be as easily considered as forward and reverse respectively.

Turning now to output shaft 14, it can be noted to be supported in the stepped pocket 36 of the front wall 32 by a tapered roller bearing assembly 118, and in the rear wall 40 by an oppositely cooperating tapered roller bearing assembly 120 mounted in the seat 50 of the flange member 48. Actually, the bearing assembly 120 indirectly supports the rear of the output shaft through a fourth gear 122 mounted for joint rotation with the output shaft as by a spline joint 124. A third gear 126 and associated hub assembly 128 are mounted for free rotation on the front of the output shaft and are selectively coupled for joint rotation therewith by a second speed clutch assembly 130. An eighth gear 132 and associated hub assembly 134 are freely rotatably mounted on the rear of the output shaft and are selectively coupled thereto by a third speed clutch assembly 136. The third gear 126 is disposed in continually intermeshing engagement with the first gear 102.

A fifth gear 138 and associated hub assembly 140 are freely rotatably mounted on the third shaft 16 via a flanged bearing 141 having considerable capacity, and are selectively engaged thereto by a first speed clutch assembly 142 having a rearwardly extending drum 143 secured to the third shaft. Also, a sixth gear 144 is mounted for joint rotation with the third shaft by a spline joint 145, and a seventh gear 146 is connected to the drum 143 via a spline joint 147 and thus is indirectly connected to the third shaft. The sixth gear 144 is continually intermeshed with the third gear 126, the seventh gear 146 is continually intermeshed with both the second gear 110 and the eighth gear 132, and the fifth gear 138 is continually intermeshed with the fourth gear 122. Like the input shaft, the third shaft 16 is rotatably supported in the front pocket 38 by a needle or roller bearing assembly 148, and in the rear pocket 44 by a needle or roller bearing assembly 150.

The first, second and third speed clutch assemblies 142, 130 and 136 are similar in construction to the directional clutch assemblies 92 and 94 and therefor need not be described in detail. However, the size of the plates and discs, the actuating pistons, and several other members are advantageously the same for improved parts commonality.

INDUSTRIAL APPLICABILITY

In operation, the input shaft 12 of the countershaft transmission 10 is driven by the torque converter output shaft 72 and this drives the front and rear drums 88 and 90 of the directional clutch assemblies 92 and 94 respectively in, for example, a clockwise direction when viewing along the input axis 20 from the front of the transmission. Assuming that a first forward speed condition is desired, the operator so controls the vehicle as to cause the forward clutch assembly 94 and the first speed clutch assembly 142 to be hydraulically actuated so as to engage or clamp the interleaved plates and discs thereof together. This respectively connects the second gear 110 to the input shaft 12 and the fifth gear 138 to the third shaft 16. Accordingly, the output shaft 14 is driven at a relatively low speed ratio by way of gear pairs 110–146 and 138–122. As shown by the broken line arrows indicated by the letter A in FIG. 2 the output shaft is driven in a clockwise direction or in the same rotational direction as the input shaft.

It is only necessary to disengage the first speed clutch assembly 142 and to engage the second speed clutch assembly 130 in order to shift the transmission 10 from first to second forward speed. In this mode the speed reduction ratio is reduced and the output shaft 14 is driven at a higher speed by way of gear pairs 110-146 and 144-126.

Second speed clutch assembly 130 is disengaged and third speed clutch assembly 136 is engaged to shift from the second forward to the third forward speed condition. This further reduces the speed reduction ratio and drives the output shaft 14 at a maximum speed via gear pairs 110-146 and 146-132.

In the first reverse speed condition only the reverse clutch assembly 92 and the first speed clutch assembly 142 are engaged. Torque is thereby transmitted to the output shaft 14 via the three gear chain 102-126-144 and the gear pair 138-122. In this instance the freewheeling third gear 126 advantageously serves as the idler so that the output shaft is driven in a rotational direction opposite to the input shaft 12 and this may be visualized by reference to the directional arrows identified by the letter B in FIG. 2.

The number of gear teeth and corresponding speed reduction ratios obtained with one embodiment of the countershaft transmission 10 are shown by the charts immediately below:

| Number of Gear Teeth |
| --- |
| Gear 102: 33 teeth |
| Gear 110: 47 teeth |
| Gear 126: 57 teeth |
| Gear 122: 69 teeth |
| Gear 138: 27 teeth |
| Gear 144: 41 teeth |
| Gear 146: 58 teeth |
| Gear 132: 39 teeth |

| Gear Reduction Ratio | | |
| --- | --- | --- |
| | Forward | Reverse |
| Low | 3.15 | 3.18 |
| Intermediate | 1.72 | 1.73 |
| High | 0.83 | 0.84 |

A feature of the countershaft transmission 10 is that the physical location of the first speed clutch assembly 142 on the third shaft 16 is such as to minimize the overall size thereof because additional speed reduction is provided downstream thereof via the gears 138-122.

Another feature of the countershaft transmission 10 resides in the use of back-to-back directional clutch assemblies 92 and 94 which are laterally in longitudinal alignment with the back-to-back second and third speed clutch assemblies 130 and 136 respectively. Also, the first speed clutch assembly 142 is laterally in longitudinal alignment with the forward and third speed clutch assemblies 94 and 136. This closely spaced radial relationship of the clutch assemblies with the various gears being axially spaced outside thereof, but within the front and rear walls 32 and 40, provides maximum radial compactness of the transmission as can be visualized by reference to FIG. 2 and the overall width and height delineators identified by the letters "W" and "H" respectively. A relatively short length of the transmission is also obtained in the longitudinal direction of the shafts as can be noted by reference to FIG. 1 and to the overall length delineation thereof by the letter "L". A portion of the overall length is due to the construction of the stepped pockets 36, 38, 42 and 44 which advantageously provide a plurality of pressurized fluid operating passages and lubrication passages thereat. Moreover, the two-piece housing 18 and its bores 34, 46 and pockets 36, 38, 42 and 44 allow convenient assembly and disassembly of the transmission.

In view of the foregoing, it is apparent that the countershaft transmission 10 is simple and rugged in its construction, and is of light weight. Two forward and two reverse speeds are achievable through use of only four clutch assemblies 92, 94, 142 and 130, seven gears 102, 110, 126, 122, 138, 144 and 146, and three shafts 12, 14 and 16. Moreover, only one additional clutch assembly 136 and one additional gear 132 are required to provide three forward speeds and three reverse speeds.

Other aspects, objects and advantages of this invention can be obtained from a study of the drawings, the disclosure and the appended claims.

I claim:

1. In a countershaft transmission of the type having an input shaft having first and second gears mounted for free rotation thereon and first and second clutch means for selectively connecting one of the first and second gears respectively to the input shaft, the improvement comprising:

an output shaft having a third gear mounted for free rotation thereon, a fourth gear mounted for joint rotation therewith, and third clutch means for selectively connecting the third gear to the output shaft; and a third shaft having a fifth gear mounted for free rotation thereon, a sixth and a seventh gear mounted for joint rotation therewith, and fourth clutch means for selectively connecting the fifth gear to the third shaft, the first gear being directly connected to the third gear, the second gear being directly connected to the seventh gear, the third gear being directly connected to the sixth gear, and the fourth gear being directly connected to the fifth gear.

2. The countershaft transmission of claim 1 wherein the first, second, third and fourth clutch means are of the interleaved multiple plate and disc type and have the same preselected diameter for parts commonality.

3. The countershaft transmission of claim 1 wherein the fourth clutch means includes a drum conjointly connected to the third shaft, and the seventh gear is releasably connected to the drum and is jointly rotatable with the drum and the third shaft.

4. The countershaft transmission of claim 1 including an eighth gear mounted for free rotation on the output shaft and directly connected to the seventh gear, fifth clutch means for selectively connecting the eighth gear to the output shaft, and wherein the fourth clutch means is laterally in longitudinal alignment with the second and fifth clutch means.

5. The countershaft transmission of claim 4 wherein engagement of one of the fourth, third and fifth clutch means respectively provide the first, second and third speeds, and engagement of one of the first and second clutch means respectively provide reverse and forward modes of operation.

6. A countershaft transmission comprising:

an input shaft having first and second gears freely rotatably mounted thereon;

first clutch means for selectively connecting the first gear to the input shaft;

second clutch means for selectively connecting the second gear to the input shaft;

an output shaft having a third gear and an eighth gear freely rotatably mounted thereon and a fourth gear mounted for joint rotation therewith:

third clutch means for selectively connecting the third gear to the output shaft;

fourth clutch means for selectively connecting the eighth gear to the output shaft;

a third shaft having a fifth gear freely rotatably mounted thereon, and a sixth gear and a seventh gear mounted for joint rotation therewith; and fifth clutch means for selectively connecting the fifth gear to the third shaft, the first gear intermeshingly engaging the third gear, the second gear intermeshingly engaging the seventh gear, the third gear intermeshingly engaging the sixth gear, the fourth gear intermeshingly engaging the fifth gear, and the seventh gear intermeshingly engaging the eighth gear.

7. The countershaft transmission of claim 6 including a housing defining a first wall and a second wall, and bearing means for rotatably supporting the shafts between the walls.

8. The countershaft transmission of claim 6 wherein the input shaft has a first axis and the output shaft has a second axis directly vertically below the first axis.

9. The countershaft transmission of claim 8 wherein the third shaft has a third axis located elevationally between the first and second axes and transversely offset therefrom.

10. The countershaft transmission of claim 6 wherein the first and third clutch means are laterally in longitudinal alignment, and the second and fourth dlutch means are laterally in longitudinal alignment.

11. The countershaft transmission of claim 10 wherein the fifth clutch means is laterally in longitudinal alignment with the second and fourth clutch means.

12. The countershaft transmission of claim 6 wherein the engagement of the fifth clutch means provides a low speed range.

13. The countershaft transmission of claim 12 wherein the engagement of the third clutch means provides an intermediate speed range and the engagement of the fourth clutch means provides a high speed range.

14. The countershaft transmission of claim 6 wherein the engagement of the first and second clutch means provides reverse and forward modes of operation respectively.

15. The countershaft transmission of claim 6 wherein all of the clutch means have a plurality of interleaved plates and discs having the same diameter for parts commonality.

* * * * *